Dec. 4, 1928.　　　　　　　　　　　　　　　　　　　1,694,180
N. JOHNSON ET AL
GRAIN DOOR FOR BOX CARS
Filed July 14, 1927　　2 Sheets-Sheet 1
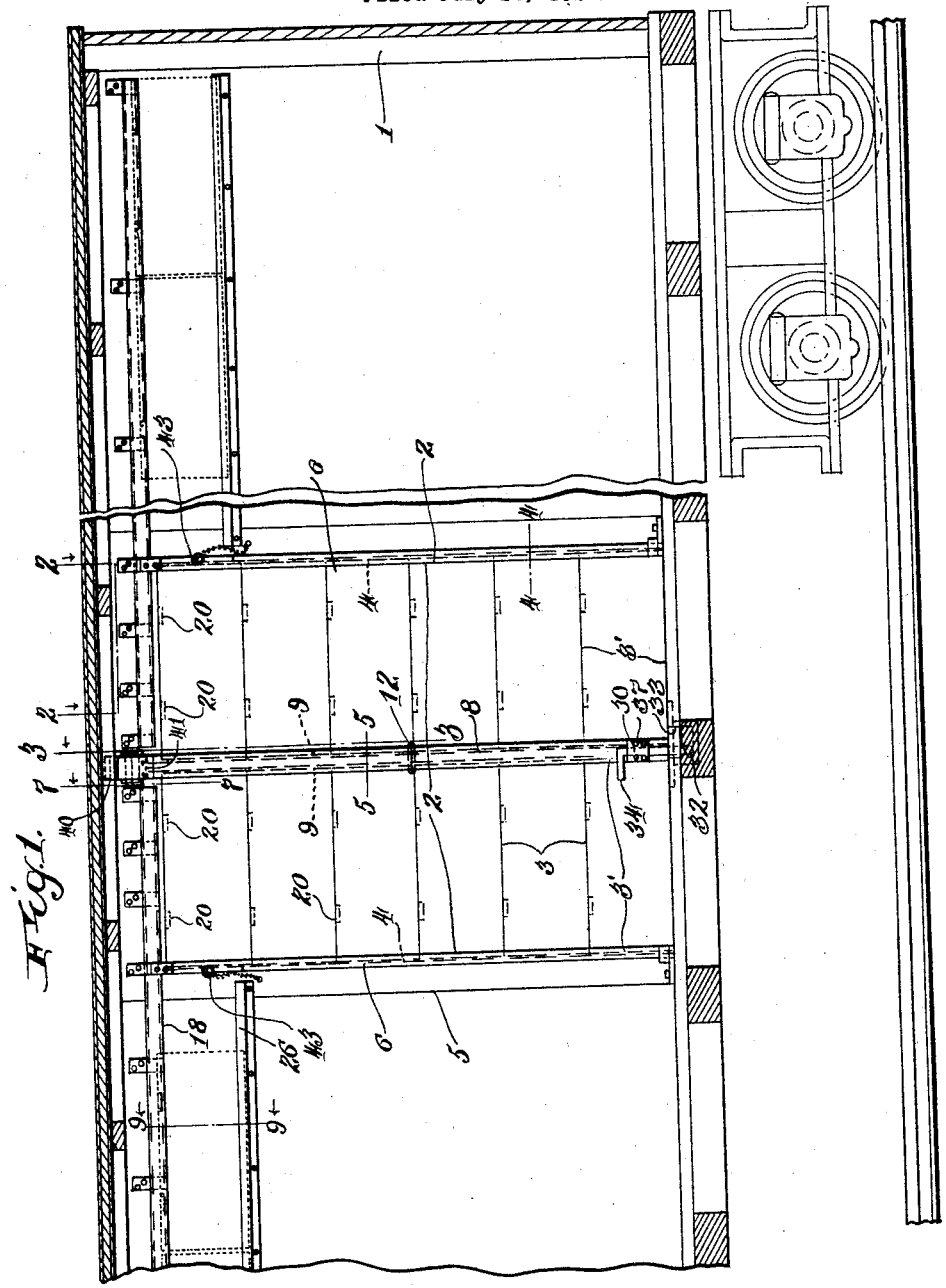

Dec. 4, 1928.
N. JOHNSON ET AL
1,694,180
GRAIN DOOR FOR BOX CARS
Filed July 14, 1927        2 Sheets-Sheet 2
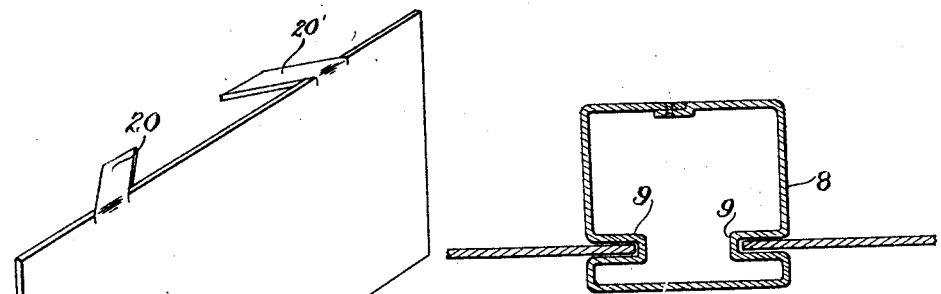
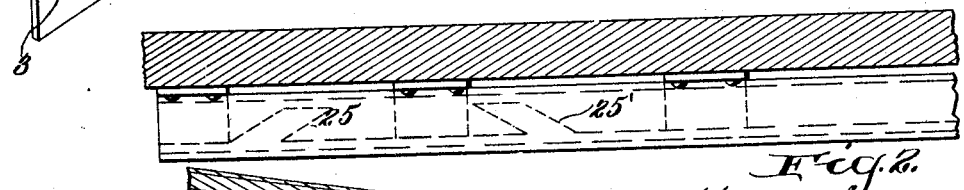
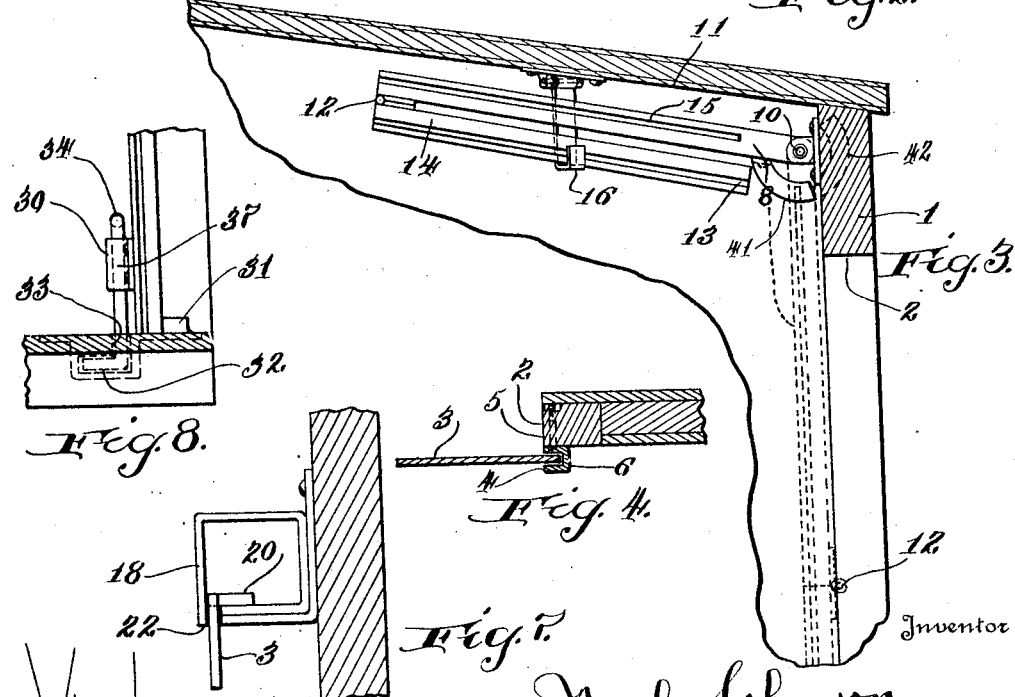

Patented Dec. 4, 1928.

1,694,180

UNITED STATES PATENT OFFICE.

NOAH JOHNSON AND LOUIS H. STRASSER, OF ST. LOUIS, MISSOURI.

GRAIN DOOR FOR BOX CARS.

Application filed July 14, 1927. Serial No. 205,616.

The invention relates to a door or closure to take the place of the temporary wooden inside door in general use for loading grain and other material handled in box cars in bulk. The object of the improved construction is to hold the cargo in position during loading and unloading so that the car can be filled to its full capacity and unloaded without loss.

The device of the invention is a permanent fixture in the car, as distinguished from the temporary wooden closure which is removed each time the car is unloaded, but it may be supplied as a unit or attachment capable of being affixed to the inside of any steel or wooden box car, thus becoming part of the car equipment.

The door which is the subject of the invention is composed of a series or set of sections which may be of sheet steel or any suitable material. These sections are of relatively small area and light weight, capable of being slid upwardly into longitudinal ways near the roof, along which ways the sections are moved longitudinally of the car away from the door opening, so that the entire set of sections forming the door may be thus stored near the top of the car without obstructing the doorway or the storage space and be instantaneously returned to their respective positions in the doorway, in which positions they rest with the top and bottom edges of the adjacent sections in contact, the end edges engaging the sides of the opening, which sides are provided with vertical ways which are so aligned with the longitudinal ways as to permit the sections to pass from engagement with one set of ways into engagement with the other set of ways, i. e., from the longitudinal ways to the vertical ways and vice versa.

The construction of the invention, in addition to the foregoing, has all the advantages of the temporary wooden door in that the door opening is gradually closed, the door being built up section by section from the bottom, as the sections are moved downwardly into place, supporting the load as the bulk cargo accumulates to a higher and higher level within the car, at the same time offering the minimum of obstruction to the admission of the commodity being loaded.

Not only may the construction be formed in sections, dividing the area of the door in the direction of its height, but it may also be divided in a horizontal direction, the meeting ends of the sections being supported by means of uprights which, when the door sections are removed, swing upwardly against the roof of the car. It is, however, not regarded as an essential feature of the invention in its broadest conception that the sections be divided as to the horizontal as well as to the vertical dimension.

In the accompanying drawings we have illustrated a grain car door embodying the features of our invention in the preferred form, together with so much of a box freight car construction as is regarded as desirable to a full comprehension of the invention and the manner of operating and applying the same.

In the drawings:

Figure 1 is a vertical longitudinal section of a box car, one end being broken away for convenience of illustration, the door being shown closed as seen from the inside of the car.

Figure 2 is a horizontal section on the line 2—2 of Figure 1 looking downwardly at the longitudinal supporting rail.

Figure 3 is a transverse section on the line 3—3 of Figure 1 looking to the right.

Figure 4 is a section on the line 4—4 of Figure 1.

Figure 5 is a section through the upright support which carries the adjacent ends of the sections when the door is divided horizontally, the same being taken on the line 5—5 of Figure 1.

Figure 6 is a perspective view of one of the door sections.

Figure 7 is a view looking at the longitudinal rail or support from the inner end toward the center of the door, the same being taken from the line 7—7 of Figure 1.

Figure 8 is a section on the line 8—8 at the bottom of the intermediate support, showing the manner of fastening the same.

Figure 9 is a section on the line 9—9 of Figure 1.

Referring to the drawings by numerals, each of which is used to indicate the same or similar parts in the different figures, the construction shown comprises a freight car body 1 which may be of any type available. This freight car body has the usual or any suitable side opening 2 which may be closed by the usual external sliding door, not shown. In accordance with the present invention the door opening is closed independently of the usual sliding door or other closure which, when opened, exposes the entire vertical length of the door opening.

The improved closure, in accordance with the invention comprises a series of closing means referred to as sections or plates, which may be successively operated to close the door opening from the bottom up and which, in opening the door are operated in reverse succession from the top down, the said members being moved successively in each instance. In the form of the invention illustrated, the series of separate closing members is shown in the form of plates or sections 3 seated at their ends in the closed position of the door in vertical grooves or ways 4 which may be formed in or on the door jambs 5 in any suitable manner as by affixing thereto along the side or vertical edges of the opening, small strips 6 provided with grooves 4, or other means adapted to serve as ways. These members are inwardly disposed toward the door opening, the ways being shown on the inside of the jamb so that the closing means of the invention may be placed on the inside of the car, as already specified.

In the form of the invention illustrated, one of said channel members 6 is shown on each side of the door opening and the outside end edges of the plates 3 are engaged therewith or therein.

In accordance with the preferred form of the invention illustrated, the plates or closing members 3 composing the series are divided transversely to their horizontal dimension or length and there is an upright support 8 intermediate of the horizontal dimension of the door opening. This support, which is shown in the preferred form in horizontal section in Figure 5, is grooved vertically or provided with vertical ways at 9, 9 at each side to receive or engage the corresponding adjacent ends of the plates 3.

In order to avoid the obstruction of the door opening which would result from locating this upright support permanently at an intermediate position in the door opening, it is preferably made removable and, in the form of the invention shown, it is hinged at the top at 10 to the inside of the car so that it may be swung backwardly and upwardly against the ceiling or roof 11, and to reduce the radius of the swing this upright support has been shown as made in sections 14 and 15 hinged intermediately at 12 so that the lower section 14 may be folded forwardly beneath the top section 15, the folded upright being shown as supported on a hook 16 which is secured to the roof or ceiling. The hinging of the upright at the intermediate point 12 is not essential to the invention and it may be considered desirable for certain purposes to omit the hinged joint at the center.

The manner of removing the plates from the door opening and supporting them forwardly and rearwardly of the door opening, preferably against the sides of the car near the top so that the top of the door opening and all other portions of the door opening are available for admission and removal of the cargo, is of particular interest. In the form of the invention shown, this comprises a longitudinal slotted way or support shown in the form of slotted tubular members 18 which are preferably secured to the side wall of the car, extending in a fore and aft direction. In the form shown, where a central upright is used, these members extend to the front and rear from each side of the central upright.

The plates or closure members 3 are shown as provided with lateral hooks or tabs 20 and 20', which may be conveniently formed by cutting the top edge of each plate in such manner as to provide tabs or lateral projections, the inner edge of which makes an acute angle with the lateral edge of the plate. The tabs or lateral projections are then bent so that a plane passed through the tab will form substantially a right angle with a plane passed through the plate. These tabs or lateral projections are equally spaced so that the tabs on the different sections reigster with each other or lie in vertical alignment in the closed position of the door, and tabs 20 and 20' are preferably oppositely or differently inclined, as shown particularly in Figure 1, and the tabs of each set 20 and 20' respectively, move in two corresponding vertical paths as the sections are operated. The supports or ways 18 which are preferably slotted longitudinally at 22 to admit the top edges of the plates 3, the slots 22 being aligned with the grooves 4 at the sides, and the grooves 9 in the central support are formed with transverse slots 25 and 25' in the paths of the tabs or projections 20 and 20' respectively, which members 20 and 20' act as hooks engaging with the way 18, as shown in Figure 7, to support the plates 3 in open position. It is of importance to note that the arrangement of slots 25, 25' and hooks 20 and 20' enable the tabs of each set to pass both ways through the corresponding slots and to bridge and pass over the slots provided for the tabs of the other set.

It is, therefore, apparent that as each section is moved upwardly and reaches the top of the door opening, the top edges of the plates 3 will enter the longitudinal slots 22, or otherwise come into operative relation with the ways 18, and the hooks or projections 20 and 20' will pass through the transverse slots 25 and 25' and the plates being then moved laterally, i. e., in the direction of their length and of the length of the car, to the right or left in Figure 1, i. e., the plates in front of the central upright being moved forwardly and those to the rear of the same naturally being moved rearwardly the hooks will pass out of registration with the slots and the plates or sections will be supported on the rails 18 by the hooks.

In accordance with the preferred form of the invention shown, further securing and supporting means for the sections may be provided in the form of bottom guide rails 26. These rails, as shown, are secured to the side of the car, spaced downwardly from the top rails 18 by a distance slightly less than the width of one plate 3, i. e., the plates extend within both grooves which take up a portion of their width. The member 26 may be merely offset as to its upper portions, as shown in Figure 9, to provide a longitudinal groove 27 when the strip is secured to the car wall to receive the bottom edges of the plates adjacent to the sides of the car. These guide rails serve to prevent swinging of the plates and particularly serve, in closing the door, to guide the bottom edges into registration with the vertical grooves or ways 4 and 9, the top edges being led directly into the grooves by a slot 22 in the longitudinal top rail 18.

In the operation of the closure or door, to close the same the upright member 8 is first released from the hook 16, being swung downwardly about the hinge 10, and the lower section is further rotated about the hinge 12 intermediately of the bar bringing the upright into vertical position. The bottom end 13, resting against the abutment, is then secured by means of the fastening 30.

The fastening 30, in the form of the invention shown, consists of a rotary vertically sliding bolt having swinging horizontal arm 32 at its lower end which moves downwardly into locked position through a slot 33 in the floor, said bolt having a horizontal radial handle lever 34 at its upper end by which the bolt is moved up and down through the slot and rotated to carry the arm 32 out of registration with the slot. The arms are preferably at right angles to each other, so that when the top arm is turned to lie against the rail the bottom arm is at right angles to its slot 33, which is at right angles to the plane of the door. The bolt is held in vertically sliding relation to the door by U shaped plate 37.

The sections 3 are moved to closed position in the reverse order to that in which they were raised and stowed, the section which is first on one side. it being immaterial which side is operated first, being moved laterally along the supporting rail 18 and the guide rail 26 until it lies in the door opening. The edges of the plate or section are thus brought into registration with the vertical grooves or guides 9 in the intermediate upright, if there is one, and 4 on or in the jamb at the side of the door.

It is to be particularly noted that the bottom guide 26 in cooperation with the top guide or rail 18 serves to hold the plate in such position that its forward end edge as it moves into the doorway, is guided into the corresponding slot or grooves 9 and 4. When the plate or section reaches this position with its edges in registration with the groove or guides 4 and 9, the supports or tabs 20 are likewise brought into registration with the slots 25 in the supporting rails 18 whereby the plate or section thus operated is released from the top rail or longitudinal support 18 and permitted to move downwardly with its edges in the vertical grooves 4, 9, it being understood that the bottom rail 26 is discontinued at the jambs. The two plates supported by the top rail 18 nearest the doorway on each side in the open position of the door occupy in the closed position of the door the bottom of the doorway, these two plates being indicated in Figure 1 showing the closed position by reference character 3'. In closing the door the plates are moved down successively, as described, and take successive and corresponding positions in the doorway, being located with the top and bottom edges of the adjacent plates in contact and their edges engaging the vertical grooves or guides, as illustrated in Figure 1.

The car may, as already suggested, be provided with the usual sliding door, covering the sectional closure, the sectional closure being for the purpose of holding a bulk cargo, as grain, to permit it to be unloaded without loss, the top sections being, in the opening operation, first removed from the door opening and stowed, as illustrated, in the top of the car near the sides, and as the cargo is removed the sections of the closure are successively moved upwardly and stowed in the ways or rails 18, 26, as already described. Pins 43 or other means may be provided to prevent the displacement of the sections from their open position from which they might tend to enter the doorway by sliding along the rails. These pins may be seated in the car wall or in upright channel members 6. The center post may to advantage be provided with an abutment member for preventing the accidental movement of the plates into the doorway when the post is removed from closed position. For this purpose we have shown an arcuate member 41 which swings into a slot 42 in the door.

We have thus described specifically and in detail a sectional car door closure in accordance with the preferred form of the invention, in order that the nature and operation of the same may be clearly understood, however, the specific terms herein are used descriptively rather than in a limiting sense, the scope of the invention being defined in the claim.

What we claim as new and desire to secure by Letters Patent is:

A closure for a door opening comprising a plurality of sections, upright guides and longitudinal substantially horizontal supporting ways extending across the top of the door opening and to one side thereof, whereby the sections may be arranged in vertical series to close the door opening and supported in longitudinal arrangement at the sides of the door opening, the sections having hooks for engaging the supporting ways, there being a plurality of hooks on each section, the corresponding hooks on each section forming a plurality of series, the longitudinal ways having slots to correspond to and pass each series of hooks, the hooks in each series being differently arranged from the hooks of the other series whereby the hooks of each series are enabled to bridge and be supported across the slots corresponding to the other series.

Signed by us at St. Louis, Missouri, this 22nd day of June, 1927.

NOAH JOHNSON.
LOUIS H. STRASSER.